E. W. GMELIN.
DIRECTION INDICATOR.
APPLICATION FILED AUG. 20, 1918.
1,333,973.
Patented Mar. 16, 1920.
2 SHEETS—SHEET 1.
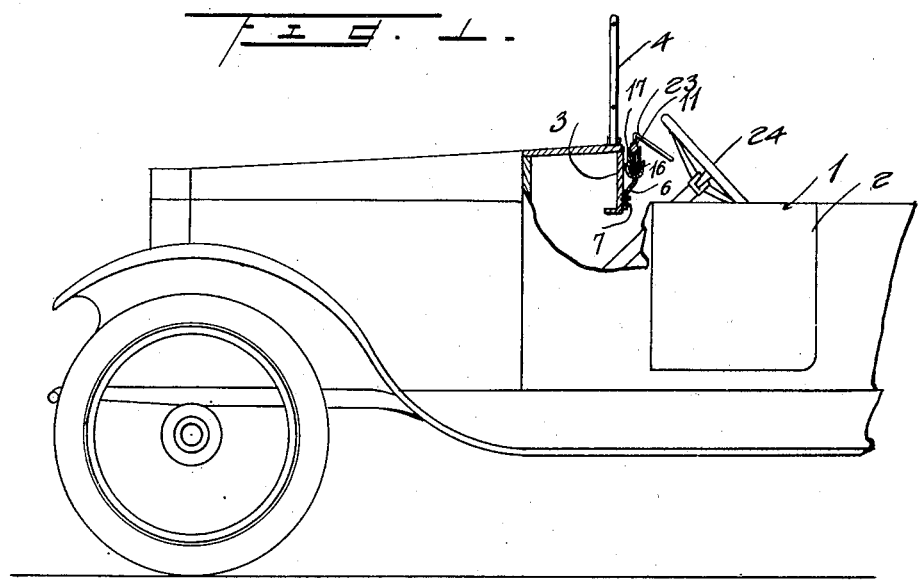
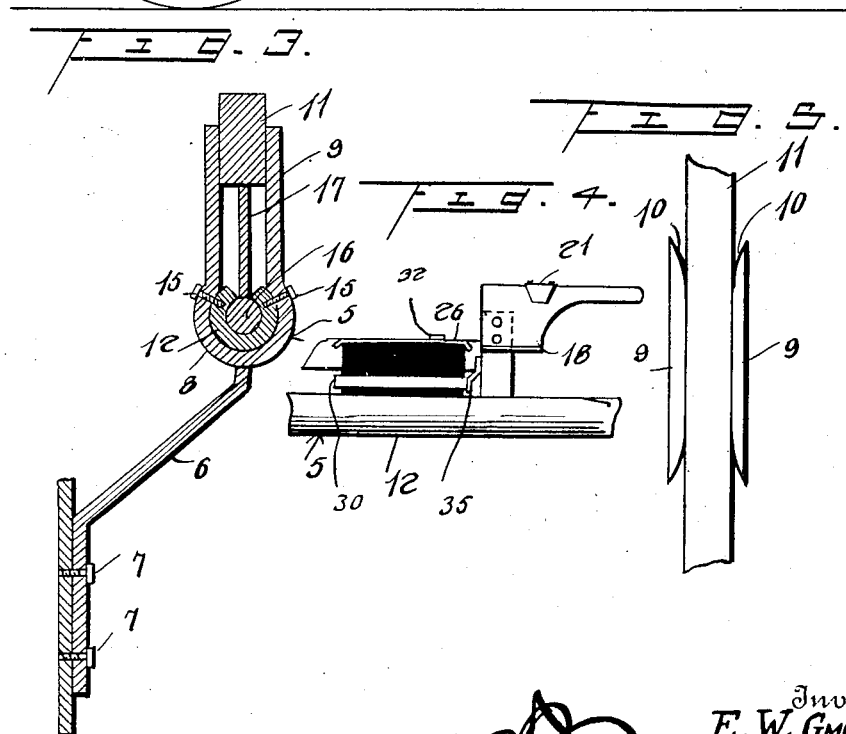
Inventor
E. W. Gmelin.
Attorney

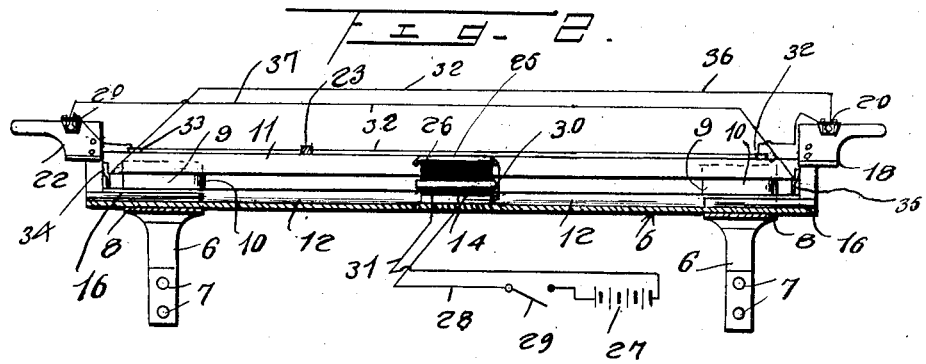

UNITED STATES PATENT OFFICE.

ERNST W. GMELIN, OF EL PASO, TEXAS.

DIRECTION-INDICATOR.

1,333,973.    Specification of Letters Patent.    Patented Mar. 16, 1920.

Application filed August 20, 1918. Serial No. 250,692.

*To all whom it may concern:*

Be it known that I, ERNST WILHELM GMELIN, a subject of the Emperor of Germany, residing at El Paso, in the county of El Paso and State of Texas, have invented certain new and useful Improvements in Direction-Indicators; and I do hereby declare the following to be a full, clear, and exact description of the invention, such as will enable others skilled in the art to which it appertains to make and use the same.

This invention relates to improvements in direction indicators, and has for one of its objects the provision of means whereby an operator of an automobile may readily indicate to traffic in front and rear thereof in which direction a turn is to be made or if a stop is contemplated.

Another object of this invention is the provision of signaling members slidably mounted on the automobile and adapted to be slid laterally thereof, so that traffic in front and rear can readily see and determine the course of the respective automobiles.

A further object of this invention is the provision of means for automatically illuminating the signaling members when moved into signaling position.

A still further object of this invention is the provision of a direction indicator of the above stated character, which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference will be had to the following description and accompanying drawings, in which:

Figure 1 is a fragmentary side elevation, partly in section of an automobile illustrating my invention applied thereto, Fig. 2 is a vertical sectional view of a direction indicator constructed in accordance with my invention, Fig. 3 is a transverse sectional view, illustrating the means of supporting the signaling member, Fig. 4 is a fragmentary view, illustrating means for automatically illuminating the signaling members, Fig. 5 is a fragmentary plan view of the brackets, Fig. 6 is a side elevation, partly in section, of one of the signaling members, Fig. 7 is a sectional view of the same, Fig. 8 is an end elevation of the device.

Referring in detail to the drawings, the numeral 1 indicates as an entirety an automobile including a body 2, having an instrument board 3 and a windshield 4. The foregoing description relates to a well known construction of automobile and to which my invention is applied.

Brackets 5, having downwardly inclined arms 6, are secured to the instrument board, as illustrated at 7. The brackets 5 are provided with a tubular portion 8, provided with upstanding flanges 9, having their inner faces at their upper ends cut away, as illustrated at 10, to permit a bar 11 to slide freely between the same. A bracket 5 is secured to each end of the instrument board 3, and supports the ends of a tubular member 12, which is provided with longitudinal slots 13 in the top face thereof, and which slots extend from each end toward a point intermediate the ends. The slots 13 terminate in spaced relation to each other at the intermediate portion of the tubular member 12 to form a solid portion or stop 14. The tubular member 12 is secured within the tubular portion 8 of the brackets 5 by means of set screws 15.

Guide members 16 are slidably mounted within the tubular or supporting member 12 and have formed thereon upstanding arms 17, which connect with the ends of the bar 11. The bar 11 has secured to each end signaling members 18 in the form of hands, but may be of any other desired shape. The signaling members 18 may be painted, or otherwise coated, in any desired color, preferably white, so that they can be readily observed by approaching and following traffic of the respective automobiles. The signaling members 18 are provided with cutout portions 19 in which are positioned electric lamps 20. The electric lamps 20 are supported within the cutout portions 19 by means of reflectors 21 secured to the signaling members by arms 22, so that the rays of light from the electric lamp will be directed downwardly over the signaling members, thus making them visible at night time. A suitable handle 23 is secured to the bar 11, and is normally positioned adjacent the steering wheel 24 of the automobile 1, so that the operator of the automobile may readily grip the same for sliding the bar 11 laterally of the automobile in either direction to dispose either of the signaling members 18 to one side of the automobile in view of the traffic in front and rear thereof. When it is desired to indicate that a turn is to be made to the left, the handle 23 is moved to the left, positioning the signaling member upon the left hand side laterally of the automobile, and which is limited in its movement by the arm 17 adjacent the other signaling member abutting the stop 14. To indicate a turn to the right, the handle 23 is moved in an opposite direction.

A block 25 of insulating material, which is secured to the upper side of the stop 14, is provided on its upper side with a contact strip 26. The contact strip is connected to one side of a battery 27 by a wire 28 in which is located a switch 29. A contact band 30 surrounds the block 25 at a point below the contact strip 26, and it is connected to the outer side of the battery 27 by a wire 31. The lamps 20 are electrically connected by a wire 32, and secured to the bar 11 adjacent each end thereof is a contact finger 33, the fingers being electrically connected with the wire 32. A contact finger 34 is secured to one end of the bar 11, and a contact finger 35 is secured to the other end of the bar 11. A wire 36 leads from one of the lamps 20 to the contact finger 34, and a wire 37 leads from the other lamp to the contact finger 35, the arrangement being such that the contact finger at one end of the bar 11 is electrically connected with the lamp at the other end of the bar. When the bar 11 is moved to project one of the lamps 20 and the adjacent indicator hand 22 beyond one side of the automobile, the contact fingers farthest removed from such lamp and indicator hand are brought into engagement with the contact strip 26 and the contact band 30, respectively. This establishes, when the switch 29 is closed, an electric circuit which includes the lamp projected, resulting in the lamp being illuminated immediately upon being moved into projected position. When the bar 11 is moved to withdraw the projected lamp and indicator hand, the contact fingers are moved out of engagement with the contact strip 26 and contact band 30, resulting in the circuit being broken.

While I have shown and described the preferred embodiment of my invention, it will be understood that minor changes in construction, combination and arrangement of parts may be made without departing from the spirit and scope of the invention as claimed.

Having thus described my invention, what I claim is:

1. A direction indicator comprising a pair of spaced brackets, substantially tubular portions formed on said brackets, vertically disposed spaced guiding elements formed on the edges of the tubular portions, a bar slidable between the guiding elements, indicators secured to the bar, a tubular member detachably secured within the tubular portions and having slots terminating at a point intermediate the ends of the tubular member to form a stop, and means formed on the bar and slidably received by the tubular member through the slots and adapted to abut the stop for limiting the movement of the bar in either direction.

2. A direction indicator comprising a pair of spaced brackets, substantially tubular portions formed on said brackets, spaced guiding elements formed on the tubular portions, a bar slidable between the guiding elements, indicators secured to the bar, a tubular member detachably secured within the tubular portions and having slots terminating at a point intermediate the ends of said tubular member to form a stop, downwardly depending arms formed upon said bar and extending through the slot, and guide members formed on the ends of said arms confined within the tubular member.

In testimony whereof I affix my signature in presence of two witnesses.

ERNST W. GMELIN.

Witnesses:
 OLIN SERWIN,
 WM. WHITE.